Figure 1:
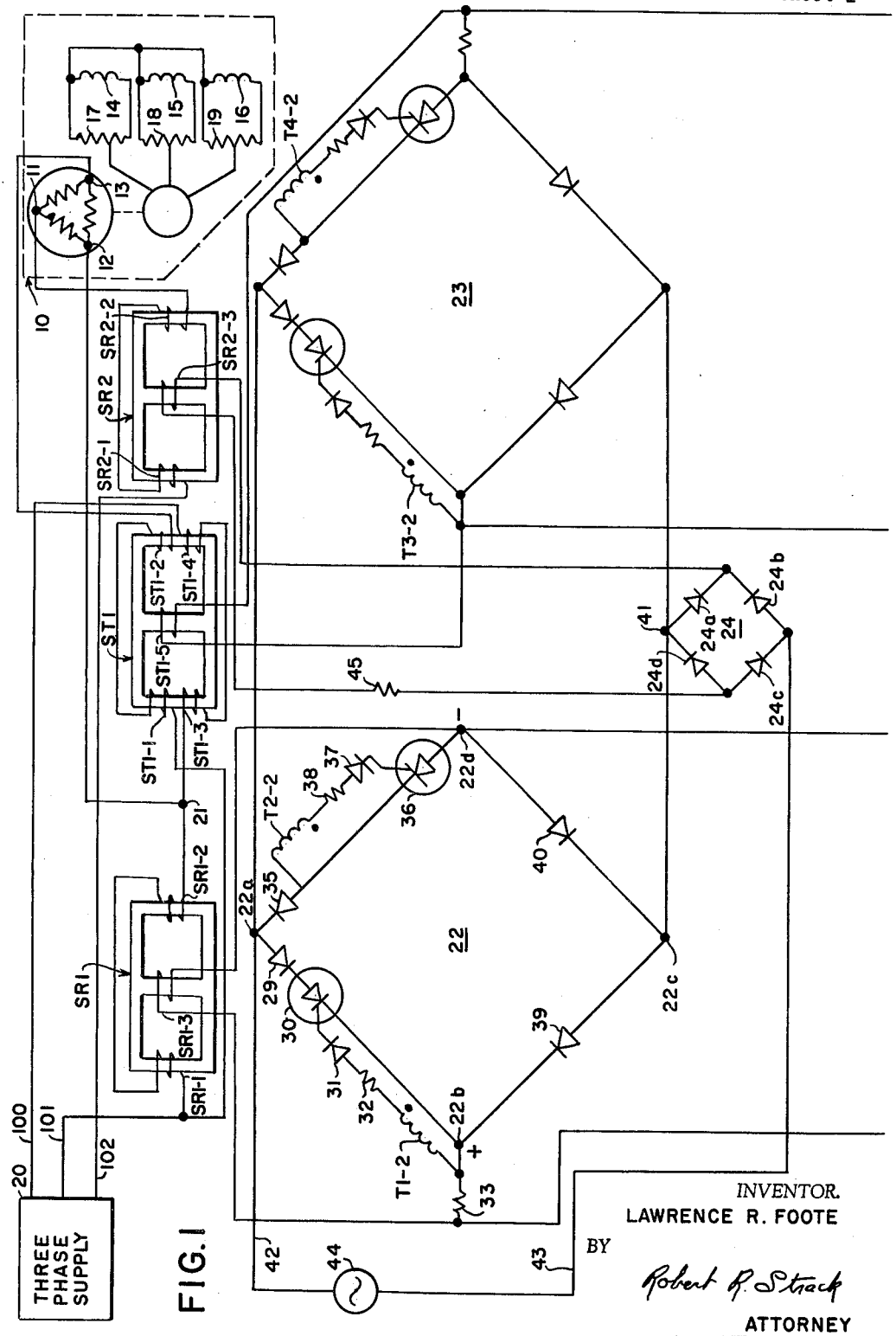

Sept. 28, 1965

L. R. FOOTE 3,209,226

CONTROL SYSTEM FOR ALTERNATING CURRENT MOTOR

Filed Aug. 1, 1961

2 Sheets-Sheet 1

INVENTOR.
LAWRENCE R. FOOTE

BY
Robert R. Strack
ATTORNEY

Sept. 28, 1965
L. R. FOOTE
3,209,226
CONTROL SYSTEM FOR ALTERNATING CURRENT MOTOR
Filed Aug. 1, 1961
2 Sheets-Sheet 2
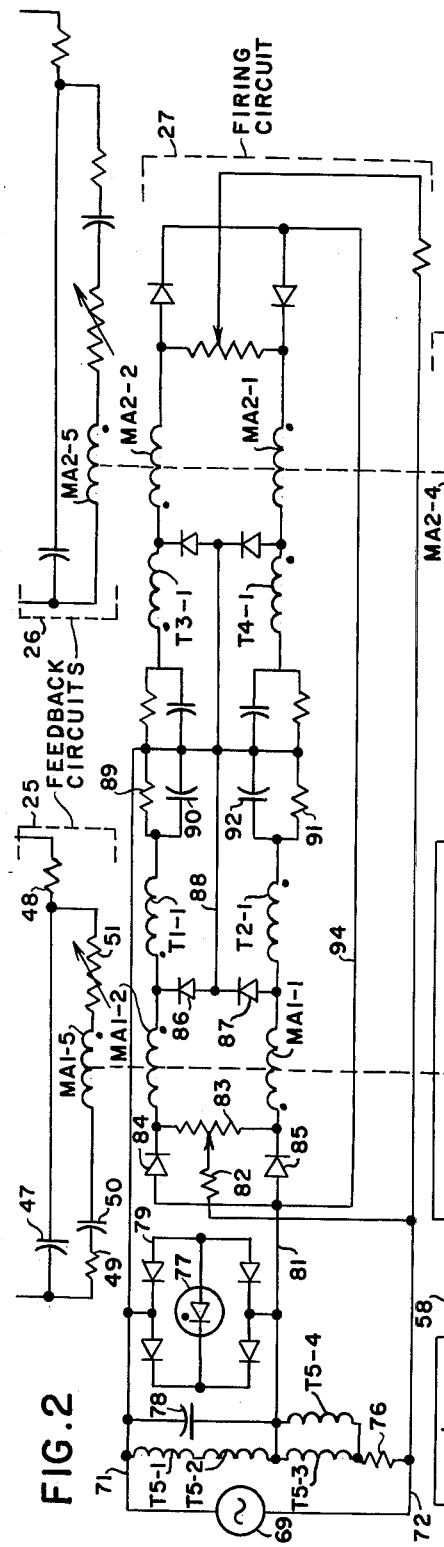
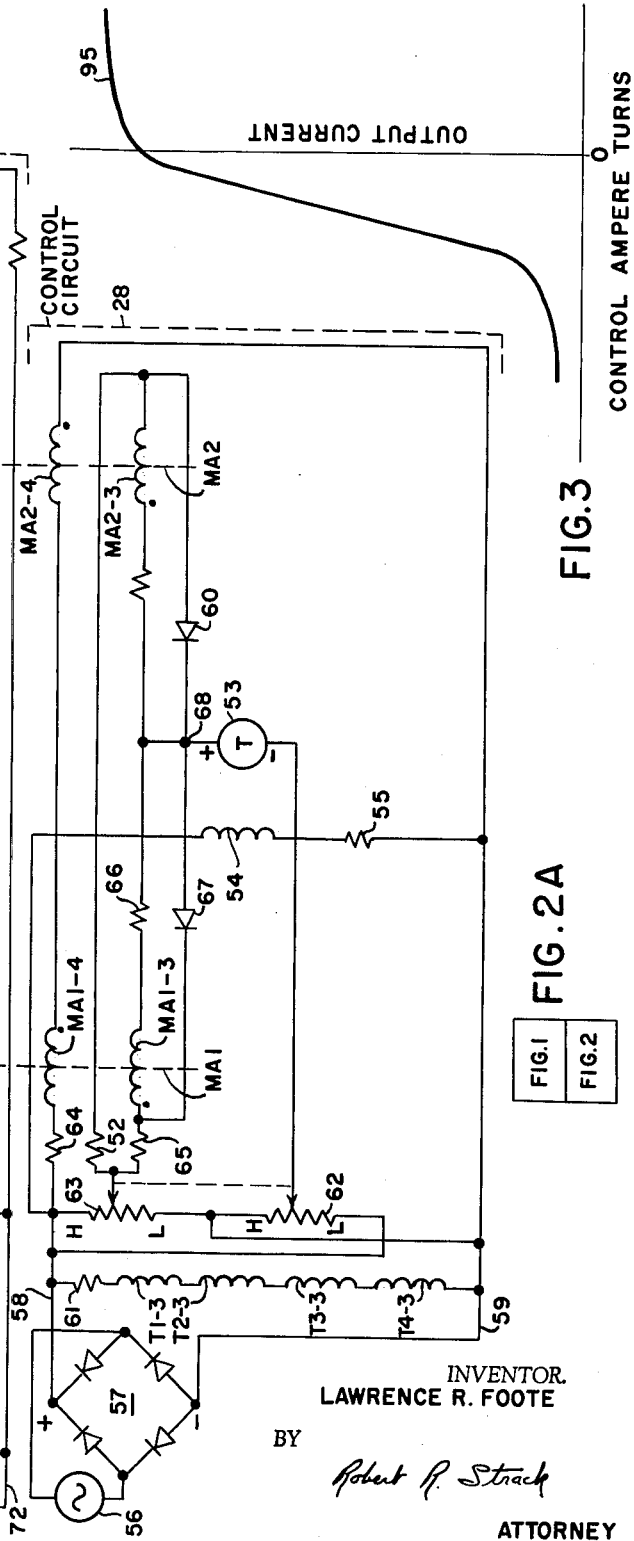
INVENTOR.
LAWRENCE R. FOOTE
BY
Robert R. Strack
ATTORNEY United States Patent Office 3,209,226
Patented Sept. 28, 1965

3,209,226
CONTROL SYSTEM FOR ALTERNATING CURRENT MOTOR
Lawrence R. Foote, Roanoke, Va., assignor to General Electric Company, a corporation of New York
Filed Aug. 1, 1961, Ser. No. 136,123
3 Claims. (Cl. 318—229)

This invention relates to motor control systems. Particularly, the invention relates to improved control circuits for alternating current motors, yielding good regulation, reliability, and stability.

The invention is directed primarily to controls for multiphase alternating current motors used, for example, in hoisting operations. Such employment requires good speed regulation and a relatively constant balance of the multiphase voltages applied to the motor during variations and reversals of torque. In general, it has been found that existing alternating current motor control systems do not yield the degree of regulation that it is possible to achieve with direct current motor control systems. Consequently, there has been a tendency to employ direct current systems although, in many instances, they are not as economical or convenient.

An object of the invention is to provide an improved control system for multiphase motors.

Another object of the invention is to provide an improved control system for multiphase motors used in hoisting operations which maintains a substantial balance of voltage on all phases during variations in torque.

A further object of the invention is to provide a reliable and rapidly responsive alternating current control system for a multiphase motor, yielding regulation characteristics comparable to that achieved with direct current motor control systems.

Patent No. 2,958,814, granted to L. R. Foote, on November 1, 1960, discloses an invention directed toward some of the objects of the present invention. The cited patent discloses a multiphase motor having the primary terminals thereof connected through saturable reactors and a saturating transformer to a power supply. The saturation states of the saturable reactors and the saturating transformer are controlled by two magnetic amplifier arrangements to effect either a forward or reverse torque operation of controlled magnitude.

The instant invention may be considered an improvement of the control circuit disclosed in the aforecited patent. Primarily, the improvement herein resides in the utilization of controlled rectifier circuits for controlling the saturation state of the above mentioned saturable reactors and saturating transformer. This yields considerable increase in the speed of response attainable. In addition, in order to obtain the necessary stability, in view of the higher gain available by the described controlled rectifier arrangement, means have been included for feeding back signals representing the saturation state of the reactors to the controlling magnetic amplifiers.

A feature of the invention resides in the utilization of controlled rectifier bridges for controlling the power applied to a multiphase motor.

Another feature of the invention resides in a unique arrangement for developing a voltage proportional to the saturation state of the aforementioned saturable reactors and saturating transformer and utilizing this voltage for stabilization.

The above and other novel features of the invention are set forth with particularity in the appended claims. The invention itself, however, both as to its organization and method of operation, together with further objects and features thereof, may best be understood by reference to the following description taken in conjunction with the accompanying drawings wherein:

FIG. 1 and FIG. 2 taken together, as illustrated in FIG. 2A, comprise a circuit schematic of an illustrative embodiment of the invention; and FIG. 3 is a graphic representation of the characteristic curves of self-saturating magnetic amplifiers of the nature employed in the illustrated embodiment.

Referring to the circuit schematic in FIGS. 1 and 2, an A.C. motor 10 is illustrated in the upper right corner of FIG. 1 having primary terminals 11, 12, and 13 selectively connectable through power windings of saturable reactors SR1 and SR2 and saturating transformer ST1 to three-phase supply 20. The three phases of the secondary winding of motor 10 are illustrated as connected to conventional compensating circuitry consisting of inductances 14, 15, and 16, and tapped resistors 17, 18, and 19.

As well known, the speed of a three-phase A.C. motor is determined by the amount of power applied to the primary terminals thereof and the direction of rotation is determined by the particular phase sequence with which the power is applied to the three primary terminals. In the instant disclosure, as in the disclosure of above cited Patent No. 2,958,814, these factors are controlled by a pair of saturable reactors, SR1 and SR2 and a saturating transformer ST1. As shown in FIG. 1, the primary windings ST1–1 and ST1–2 of saturating transformer ST1 are connected between line conductor 101 and primary terminal 13. The secondary windings ST1–3 and ST1–4 of saturating transformer ST1 are connected between line conductor 100 and primary terminal 12. The power winding SR2–1 and SR2–2 of saturating reactor SR2 are connected between line conductor 102 and primary terminal 11 and the power windings SR1–1 and SR1–2 of saturable reactor SR1 are connected between line conductor 101 and point 21 on secondary winding ST1–3. Point 21 may in some cases be an intermediate point on the secondary winding or, as in the illustration, it may be connected directly to one of the primary terminals of the motor 10.

Each of saturable devices SR1, SR2, and ST1 is illustrated as having divided power windings, e.g., SR1–1 and SR1–2, wound upon the outside legs of a three-leg magnetic core. The center leg of each core has a saturation control winding, e.g., SR1–3, wound thereon. The specific physical arrangement, of course, may be varied to suit specifically desired characteristics.

The described circuit configuration furnishes the means for selectively connecting respective ones of line conductors 100, 101, and 102 to specific ones of primary terminals 11, 12, and 13 in accordance with whether or not hoisting or lowering operation of motor 10 is desired. In addition, this circuitry furnishes means for supplying a preselected amount of power to motor 10 in accordance with the rate at which the motor is to operate. These controls are accomplished by varying the saturation of saturable reactors SR1 and SR2 via saturation control windings SR1–3 and SR2–3 respectively and by varying the saturation of saturating transformer ST1 by saturation control winding ST1–5.

The circuitry thus far described is similar to that disclosed in cited Patent No. 2,958,814. By controlling the saturable devices SR1, SR2, and ST1 with fast acting circuitry however, the instant invention provides better regulated operation and faster acting controls than that previously available.

The saturation state of inductive devices SR1, SR2, and ST1 is determined by controlled rectifier bridge circuits 22 and 23 and by conventional rectifier bridge 24. As subsequently described, controlled rectifier bridge circuits 22 and 23 selectively deliver saturating current to saturation windings SR1-3 and ST1-5 for predetermined periods of time to yield the desired operating condition and speed. The controlled rectifier bridge circuits 22 and 23 are in turn controlled by magnetic amplifiers MA1 and MA2, the various windings of which are vertically arranged in FIG. 2. Conventional rectifier bridge 24, in FIG. 1, is employed to supply saturation current to saturable reactor SR2 to insure balanced operation of all three phases.

In general, the control system is operative in response to alternating current and comprises a control circuit 28, a firing circuit 27, bridge rectifiers 22, 23, and 24, saturable devices SR1, SR2, and ST1, and a pair of feedback circuits 25 and 26. Control circuit 28 compares the existing motor speed with the desired motor speed and establishes the firing time within each half cycle of alternating current for a pair of magnetic amplifiers, MA1 and MA2. Firing circuit 27 contains the gate windings MA1-1, MA1-2, MA2-1, MA2-2, of the cited magnetic amplifiers and produces time-positioned triggering pulses within each half cycle of alternating current under the control of control circuit 28. Controlled rectifier bridge circuits 22 and 23 are rendered conductive by the triggering pulses and supply appropriate saturating current to saturable devices SR1, SR2, and ST1 to effect the apropriate application of power to motor 10 to establish the desired motor speed. Thus, the instant of time at which a triggering pulse is produced, i.e., the time-positioning of the triggering pulse, determines the amount of power applied to motor 10. Feedback circuits 25 and 26 are instrumental in interpreting the degree of saturation of transformer ST1 and saturating reactor SR1 for purposes of interjecting a stabilizing feedback signal into firing circuit 27.

A complete understanding of the operation of the control circuit will be available from the following circuit description.

For purposes of illustration, all control switches have been eliminated from the illustrative embodiment and it is assumed that three-phase power is continuously applied by three-phase supply 20 to conductor 100, 101, and 102. The inherently high impedance of the power windings of saturable reactors SR1 and SR2 and the high impedance of the primary and secondary windings of saturating transformer ST1 effectively prevents the three-phase supply from exerting any influence upon the operation of motor 10 until saturated conditions are imposed upon the cores of the various inductive control devices.

Control circuit 28

The operation of motor 10 is determined by the control circuit 28 located across the bottom of FIG. 2. In the illustrated embodiment motor 10 is considered as part of a hoisting system. In keeping with the parlance of such a system, "hoisting" or "lowering" operation is controlled by varying the position of the sliders on potentiometers 62 and 63. It will be noted that these sliders are "ganged" to cause corresponding motion of each in response to each setting. The notations "L" and "H" to the left of each terminal of potentiometers 62 and 63 represent the extreme positions for a lowering or a hoisting operation, respectively.

Potentiometers 62 and 63 are connected in parallel across a D.C. supply generated by an alternating current source 56 operating into a full-wave rectifying bridge 57. Conductors 58 and 59 thus represent a positive and negative supply conductor respectively and the position of the sliders on potentiometers 62 and 63 creates a potential difference therebetween for comparison with the voltage developed by a tachometer 53, which represents the existing motor speed. The result of the comparison controls the initial saturation of magnetic amplifiers MA1 and MA2, the gate windings of which appear in firing circuit 27.

Magnetic amplifiers MA1 and MA2 are of any suitable type; however, preferably they are of the self-saturating variety frequently referred to as amplistats. Each magnetic amplifier has three control windings, illustrated for magnetic amplifier MA1 as MA1-5, MA1-4, and MA1-3. In accordance with conventional operation, the cumulative ampere turns of these three control windings determines the time at which a pulse will be delivered through gate windings MA1-2 and MA1-1 which are coupled to the same magnetic core. Magnetic amplifier MA2 has similar windings and examination will show that these windings are interconnected in the circuit in a manner similar to the windings of magnetic amplifier MA1.

Magnetic amplifier MA1 will hereafter be termed the "hoist magnetic amplifier" because the output therefrom controls the hoisting torque of A.C. motor 10. Magnetic amplifier MA2 will hereafter be called the "lower magnetic amplifier" because the output therefrom controls the lowering torque of A.C. motor 10. However, it should be understood that the drive may be lowered regeneratively with output from lower magnetic amplifier MA2 or on counter torque with output from hoist magnetic amplifier MA1.

A typical relationship between the output current and the control ampere turns of magnetic amplifier MA1 or MA2 is illustrated in FIG. 3 wherein the ordinates represent the output level and the abscissae represent control ampere turns. As illustrated by curve 95, with zero control ampere turns the magnetic amplifier is substantially fully turned on, i.e., its output is close to maximum. Consequently, a negative bias is required to maintain the output voltage at a minimum value. Magnetic amplifier control windings MA1-4 and MA2-4, serially connected with resistor 64 between positive conductor 58 and negative conductor 59, supply the negative bias required to normally hold the output from their associated gate windings at substantially zero.

In order to initiate hoisting, the sliders on potentiometers 62 and 63 are moved in the "hoist" direction. As a consequence of this slider movement, it will be apparent that the voltage of the slider on potentiometer 63 is more positive than that on potentiometer 62. A circuit path is thus created from the slider of potentiometer 63, including: resistor 65, control winding MA1-3, resistor 66, tachometer 53, and the slider of potentiometer 62. Tachometer 53 is connected to motor 10 and is energized by field winding 54 which is connected in series with resistor 55 between conductors 58 and 59. Of course, a permanent magnet tachometer may also be used. The voltage developed across tachometer 53 is polarized, as shown in the drawing, in opposition to that of the circuit just traced and has a magnitude determined by the speed of rotation of motor 10. When the desired motor speed is attained, the voltage generated by tachometer 53 in combination with that appearing between the sliders of potentiometers 62 and 63 maintains a stable current flow through control winding MA1-3.

A second circuit path is present under the described hoist setting of the control potentiometers. The purpose of this is to limit the reverse excitation on the amphistat as excess negative excitation produces an increasing output.

To initiate lowering, the sliders on potentiometers 62 and 63 are moved in the "lower" direction. This slider movement causes the voltage of the slider on potentiometer 62 to be positive with respect to that on potentiometer 63. Under this setting, control windings MA2-3 are supplied by a current to establish the correct lowering rate. The connections and circuit paths for MA1 and MA2, as previously mentioned, are symmetrical.

Firing circuit 27

The firing circuit 27 translates the condition represented by the current flow in the control windings of the magnetic amplifiers into a time-positioned pulse for triggering controlled rectifier bridge circuits 22 and 23 into conduction. As shown in FIG. 2, the gate windings of magnetic amplifiers MA1 and MA2 are driven by a square wave signal developed at the output of a clipping bridge circuit 79. A transformer T5 is connected in series with a resistor 76 across alternating voltage source 69. Transformer windings T5–1, T5–2, and T5–3 are in series and winding T5–4 is in parallel with winding T5–3 to increase their current capacity. A capacitor 78 and clipping bridge circuit 79 are each in parallel with the series combination of windings T5–1 and T5–2. The output of clipping circuit 79 may be considered as appearing on conductor 81 and is applied via rectifiers 84 and 85 to gate windings MA1–2 and MA1–1 respectively of magnetic amplifier MA1. The output is also applied via conductors 81 and 94 and corresponding rectifiers to gate windings MA2–2 and MA2–1 of magnetic amplifier MA2.

At the beginning of each half cycle, the Zener rectifier 77 in clipping circuit 79 blocks current flow. Transformer T5 is thus essentially unloaded and draws only magnetizing current. Consequently, the voltage drop across resistor 76 is slight and nearly the full voltage of source 69 appears across transformer T5. As arranged, the voltage across transformer T5 is divided approximately one-third across windings T5–1 and T5–2 in series, and two-thirds across windings T5–3 and T5–4 in parallel. In accordance with conventional clipping operation, when the Zener breakdown voltage is reached, the bridge circuit conducts, clipping the voltage thereacross at the level of the breakdown voltage. The difference between this level and the voltage of source 69 appears across resistor 76. A fairly square wave is thus produced across clipping circuit 79, yielding a relatively constant firing pulse for application to the gate windings of magnetic amplifiers MA1 and MA2.

The gate windings of each magnetic amplifier are connected to deliver a time-positioned triggering pulse to the primary winding of an enabling transformer associated with particular controlled rectifiers in each controlled rectifier bridge. As described hereinafter, each controlled rectifier bridge 22, 23, has two controlled rectifiers for passing current in opposite directions on successive half cycles. For example, bridge 22 contains controlled rectifiers 30 and 36 connected in adjacent branches of the bridge. Secondary windings T1–2 and T2–2 supply the enabling signals to controlled rectifiers 30 and 36 respectively in accordance with the time-positioned triggering pulses applied to the primary windings T1–1 and T2–1 of transformers T1 and T2 located in firing circuit 27. Once again, it should be noted that similar connections interconnect lower magnetic amplifier MA2 gate windings and the enabling transformers T3 and T4 in controlled rectifier bridge 23. The functioning of controlled rectifier bridges 22 and 23 in controlling inductive devices SR1, SR2, and ST1 is considered in detail in a later section of the specification.

Because the gate windings of each magnetic amplifier are identically connected to source 69 and because they are supplied by the same square wave input from clipper 79 only those associated with hoist magnetic amplifier MA1, i.e., MA1–1 and MA1–2, will be specifically considered. In conventional fashion, the square wave input to gate windings MA1–1 and MA1–2 is full wave rectified and thus pulses are alternately applied to each winding, the pulses being successively applied every half cycle of the square wave. During the positive half cycle, current is supplied to gate winding MA1–2 in the circuit comprising: clipper 79, conductor 81, a rectifier 84, gate winding MA1–2, enabling transformer primary T1–1, a current limiting resistor 89 shunted by a capacitor 90, and conductor 71. During the negative half cycle, current is supplied to gate windings MA1–1 in the circuit comprising: clipper 79, conductor 81, a rectifier 85, gate winding MA1–1, enabling transformer primary T2–1, current limiting resistor 91 shunted by a capacitor 92, and conductor 71. By-pass rectifier 86 is connected in parallel with transformer primary T1–1 and resistor 89 to provide a low impedance shunt during the non-energizing half cycle of the square wave. Rectifier 87 is similarly connected across primary T2–1 and resistor 91.

In order to insure balanced operation of the magnetic amplifiers, wherein each gate winding fires at the same phase angle, degeneration is provided. In the case of magnetic amplifier MA1, this takes the form of potentiometer 83 connected across the full wave rectified output from rectifiers 84 and 85. The slider of potentiometer 83 is connected via resistor 82 to supply conductor 72 and consequently furnishes an adjustable voltage for balancing purposes. A similar potentiometer arrangement balances magnetic amplifier MA2.

Before proceeding with a description of the firing circuit operation on a typical cycle, the nature of the enabling transformers T1, T2, T3, and T4 should be understood. These transformers are of the substantially square hysteresis loop variety and consequently provide an output in their secondary winding upon switching between extremes of saturation. The saturation state is maintained in an initial condition by bias windings T1–3, T2–3, T3–3, and T4–3, connected across the direct current output from bridge rectifier 57 in control circuit 28. Primary windings T1–1, T2–1, T3–1, and T4–1 are suitably connected in firing circuit 27 to reverse the initial state of saturation upon occurrence of saturation of their associated magnetic amplifiers.

If it be assumed that hoisting is in progress, typical operation of firing circuit 27 may be considered. Under these conditions, magnetic amplifier MA1 is initially saturated by control circuit 28 in accordance with the setting of control potentiometers 62 and 63 and the existing speed of motor 10 as reflected in the output of tachometer 53. A square wave is applied from clipper 79 to the full wave rectifier configuration driving gate windings MA1–1 and MA1–2. During the positive half cycle of the square wave, current is supplied to gate winding MA1–2 and during the negative half cycle it is supplied to gate winding MA1–1. For a period determined by the initial saturation of magnetic amplifier MA1, only magnetizing current flows through the gate winds. Once saturation occurs at the end of this period, the impedance decreases sharply and the current abruptly increases. As described above, each gate winding is serially connected with the primary of an enabling transformer. Because of the square loop hysteresis loop characteristic of the enabling transformers, the initial magnetizing current has no effect thereon; however, upon saturation of a magnetic amplifier the increased saturation current causes the associated transformer to switch its state and produce an output on its secondary windings which are located in the bridge circuits 22 and 23.

In other words, a predetermined time after commencement of the positive half cycle of the square wave, gate winding MA1–2 delivers a current pulse to transformer primary T1–1 which induces a voltage in the secondary winding T1–2 thereof, appearing in controlled rectifier bridge 22. In accordance with conventional "dot" notation, the induced voltage is positive at the dotted terminal of secondary winding T1–2. A similar period of time after commencement of the negative half cycle of the square wave, gate winding MA1–1 delivers a current pulse to transformer primary T2–1 which induces a voltage in the secondary T2–2 thereof, also appearing in controlled rectifier bridge 22. As will now be described, these induced voltages result in enabling controlled rectifier bridge 22 for a discrete period of time during which direct current is applied to inductive devices SR1, SR2, and ST1 to furnish power to motor 10 for hoisting.

Controlled rectifier bridge circuits 22 and 23

As previously mentioned, controlled rectifier bridges 22 and 23 in combination with conventional rectifier bridge 24 are operative to control the state of saturation of saturable reactive devices SR1, SR2, and ST1. The parallel combination of controlled rectifying bridge 22 and controlled rectifying bridge 23, in series with conventional full wave rectifier 24, is connected across alternating source 44. Tracing the circuit from the upper terminal of alternating current source 44, it will be seen to include conductor 42, controlled rectifying bridges 22 and 23 in parallel, conventional rectifying bridge 24, conductor 43, and the lower terminal of alternating current source 44.

Consideration of controlled rectifier bridge 22 will yield a full understanding of both its operation, and the operation of rectifier bridge 23. Essentially, the bridge is arranged to full-wave-rectify voltage applied between terminals 22a and 22c and provide the rectified voltage between terminals 22b and 22d. Controlled rectifiers 30 and 36, inserted in adjacent branches of bridge 22, act as switches and furnish the means for providing the rectified voltage only for the intervals of time desired. Rectifiers 30 and 36 may advantageously be silicon controlled rectifiers responsive to conduct current in a forward direction following application of a positive triggering pulse or voltage between the gate and cathode electrodes thereof. This type of rectifier is non-conductive until the triggering voltage is applied, and once rendered conductive will remain in a conducting state until a reverse bias is applied between its cathode and anode electrodes.

The triggering voltage of each controlled rectifier, 30 or 36, is furnished by an enabling transformer secondary winding, T1–2 or T2–2. Secondary winding T1–2 is serially connected with current limiting resistor 32 and conventional rectifier 31 between the cathode and gate electrodes of controlled rectifier 30. Secondary winding T2–2 is serially connected with current limiting resistor 38 and conventional rectifier 37 between the cathode and gate electrodes of controlled rectifier 36. The secondary windings and conventional rectifiers are oriented to provide the required positive triggering voltage when magnetic amplifier MA1 fires, as described hereinbefore.

The output at terminals 22b and 22d of bridge 22 is applied through current limiting resistor 33 to control saturation control winding SR1–3 of saturable reactor SR1. This same output is applied to feedback circuit 25, the function of which is described in a later section of the specification. Similar connections permit controlled rectifier bridge 23 to control saturation control winding ST1–5 of saturable transformer ST1 and conventional rectifier bridge 24 to supply a balancing current to saturation control winding ST1–3 of saturable reactor SR2.

Specifically, when controlled rectifier 30 is triggered into a low impedance state, rectified current from source 44 is supplied therethrough to saturation control windings SR1–3 and SR2–3. The circuit comprises: source 44, conductor 42, rectifier 29, controlled rectifier 30, resistor 33, saturation control winding SR1–3, rectifier 40, rectifier 24a of bridge rectifier 24, saturation control winding SR2–3, resistor 45, rectifier 24c, and conductor 43. Under these conditions, saturable reactors SR1 and SR2 present minimum impedances at their power windings and consequently, line conductor 101 is effectively connected to motor primary terminal 12 and line conductor 102 is effectively connected to motor primary terminal 11. The voltage between line conductors 100 and 101 is applied to secondary windings ST1–3 and ST1–4 in the circuit including line conductor 100, windings ST1–4, ST1–3, SR1–2, SR1–1, and line conductor 101. The current flow created by this applied voltage induces a voltage in primary windings ST1–1 and ST1–2 which effectively applies a voltage at terminal 13 equivalent to that appearing on line conductor 100.

The described application of three-phase supply 20 to motor 10 initiates hoisting at a speed determined by the period during which the reactors SR1 and SR2 are saturated.

When controlled rectifier 36 is triggered into conduction, rectified current from source 44 is again supplied to saturation control windings SR1–3 and SR2–3. In this instance the circuit includes: alternating current source 44, conductor 43, diode 24b, saturation control winding SR2–3, resistor 45, rectifier 24d, rectifier 39, resistor 33, saturation control winding SR1–3, controlled rectifier 36, rectifier 35, and conductor 42. The saturation created by this application of direct voltage is similar to that created during conduction of controlled rectifier 30 and thus alternating current motor 10 is again energized for hoisting operation. Because controlled rectifiers 30 and 36 are alternately rendered conductive on successive half cycles, motor 10 is energized for an entire cycle of operation.

Typical operation

With the individual functions and operation of the various sub-circuits understood, it is possible to recapitulate and fully understand the functioning of the entire control system.

It must be recognized that the operation of the sub-circuits described was in terms of the alternating current supplied thereto. Each sub-circuit responds to each half cycle of its input. To integrate each sub-circuit into the system, the alternating current sources 44, 56, and 69 must all provide single phase current of the same frequency and phase. A convenient way of developing such sources is to use one phase from three-phase supply 20; however, any suitable arrangement is acceptable.

Assuming 'hoist" operation, during the positive half cycle of current from alternating current sources 44, 56, and 69, the following sequence of events occurs: (1) rectified current from source 56 is modified by control potentiometers 62 and 63 and compared with the output of tachometer 53 to develop a control current for initially conditioning hoist magnetic amplifier MA1 to fire at a selected time; (2) power from source 69 is gated to primary winding T1–1 of enabling transformer T1 upon saturation or firing of magnetic amplifier MA1 at the selected time; (3) voltage generated in secondary winding T1–2 of enabling transformer T1 triggers controlled rectifier 30 into a conducting state; (4) current from source 44 is rectified by controlled rectifier bridge 22 and conventional rectifier bridge 24 and used to saturate the cores of saturable reactors SR1 and SR2; and (5) power from three-phase supply 20 is selectively applied, in accordance with the mentioned core saturation, to the primary terminals of motor 10 to furnish hoisting torque. It will be obvious that the amount of power applied to motor 10 is determined by the position of the sliders on control potentiometers 62 and 63.

If the control potentiometer settings are not changed, the sequence of operation during the negative half cycle of current from alternating current sources 44, 56, and 69 will parallel that just recited. The basic operating distinction during the negative half cycle is that gate winding MA1–1 is effective to energize transformer primary T2–1 and consequently, transformer secondary T2–2 triggers controlled rectifier 36 to the conducting state. As previously described, the same amount of current will be supplied to saturable reactors SR1 and SR2.

Successive half cycles of power result in continuous application of power to motor 10. Because the setting of control potentiometers 62 and 63 produces a control voltage that is continuously compared with the speed of the motor as represented by the output of tachometer 53, feedback control is provided. Motor 10 continues to accelerate until the tachometer voltage approaches the reference voltage from potentiometers 62 and 63. At this time the excitation of control windings MA1–3 will be just the correct amount to maintain the speed constant. In order to supply greater power it is merely necessary to adjust control potentiometers 62 and 63 to increase the difference voltage to the tachometer voltage, thereby yielding a greater excitation current through control winding MA1-3.

Lowering operation requires the same procedures and similar circuitry for supplying power to motor 10. Such circuitry is generally disposed on the right side of the figures and is interconnected in the manner already considered. Lowering is initiated by repositioning the sliders on control potentiometers 62 and 63 toward the "L" terminals. In this operation, magnetic amplifier MA2 controls the application of power to enabling transformers T3 and T4, and controlled rectifier bridge 23 in conjunction with conventional rectifier bridge 24, establishes the saturation state of saturable transformer ST1 and saturable reactor SR2.

It should be recognized that with a hoist drive, the load on the system will normally cause reversal of the comparison signal between the reference potentiometers 62 and 63 and the tachometer 53 output, thereby providing positive or lifting torque for sub-synchronous speeds. For super-synchronous speeds, reactors SR1 and SR2 are saturated for regenerative action.

A full understanding of the features and functions of saturable reactors SR1 and SR2 and saturable transformer ST1 with relation to the application of power therethrough to motor 10, may be obtained from above cited Patent No. 2,958,814.

*Feedback circuits 25 and 26*

The closed loop control system comprising the control reference at potentiometers 62 and 63, the tachometer 53 output, the triggered controlled rectifier bridges 22 and 23, the saturable reactive devices SR1, SR2, and ST1, and motor 10 tends to be unstable at higher gains. Feedback circuits 25 and 26 provide unique stabilization by in effect feeding-back the change in state of reactors SR1 and ST1 to control magnetic amplifiers MA1 and MA2. It is difficult to feed-back the "state" because the reactors are alternating current devices wherein both current and voltage are dependent upon the rest of the power circuit and the speed of motor 10. In the instant circuit the time responses of the reactors SR1 and ST1 to the controlled rectifier bridge circuits 22 and 23 respectively are simulated and supplied to control windings of magnetic amplifiers MA1 and MA2.

Similar feedback circuits are provided for each saturable reactor-bridge combination and consequently, only feedback circuit 25 will be considered in detail. With respect to feedback circuit 25 it will be seen to include a capacitor 47 and a resistor 48 connected across saturation control windings SR1-3. Capacitor 47 is relatively large and consequently, the voltage developed thereacross is essentially in phase with the magnetic state of SR1-3. The feedback voltage on capacitor 47 is applied to a series circuit including resistor 49, capacitor 50, control winding MA1-5, and variable resistor 51. Thus, a current is created through control winding MA1-5 which leads the feedback voltage by an amount determined by the combined values of resistances 49 and 51, and capacitor 50. As indicated by the polarity markings on control winding MA1-5, increasing current in the saturation control winding SR1-3 is effective to increase the initial negative saturation of magnetic amplifier MA1 and consequently to decrease the power applied to the saturation control winding via controlled rectifier bridge 22.

While there has been shown a particular embodiment of the invention, it will, of course, be understood that it is not wished to be limited thereto since modifications may be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a motor control system for a multiphase alternating current motor wherein alternating current is applied to said motor through saturable reactive means controlled by time duration modulated direct current, magnetic amplifier means operative to produce time duration modulating signal conditions in accordance with the controlled saturation thereof, means for establishing said controlled saturation as a function of the difference between desired motor speed and existing motor speed, direct current supply means connected to said saturable reactive means and responsive to said time duration modulating signal conditions to supply time duration modulated direct current thereto, and feedback means controlled by the time duration modulated direct current output of said direct current supply to modify the controlled saturation of said magnetic amplifier means.

2. In a motor control system for a multiphase alternating current motor wherein alternating current is applied to said motor through saturable reactive means controlled by time duration modulated direct current, magnetic amplifier means operative to produce time duration modulating signal conditions in accordance with the controlled saturation thereof, means for establishing said controlled saturation as a function of the difference between desired motor speed and existing motor speed, direct current supply means connected to said saturable reactive means and responsive to triggering impulses to supply direct current thereto, means responsive to the time duration modulating output of said magnetic amplifier to supply triggering impulses to said direct current supply means, means controlled by the output of said direct current supply means for developing a current functionally related to the state of saturation of said saturable reactive means, and means for modifying the controlled saturation of said magnetic amplifier means in accordance with the characteristics of said developed current.

3. In a motor control system for a multiphase alternating current motor wherein alternating current is supplied to said motor through saturable reactive means having the saturation thereof controlled by supplying direct current thereto for controlling time intervals, means for developing a voltage functionally related to the speed of said motor, means for developing a voltage functionally related to the desired speed of said motor, magnetic amplifier means operative to produce an output at a time determined by the initial saturation thereof, means for comparing said developed voltages and establishing the initial saturation of said magnetic amplifier means in accordance with said comparison, direct current supply means connected to said saturable reactive means and responsive to triggering impulses to supply direct current thereto, means responsive to the output of said magnetic amplifier to supply triggering impulses to said direct current supply means, means controlled by the output of said direct current supply means for developing a current functionally related to the state of saturation of said saturable reactive means, and means for modifying the controlled saturation of said magnetic amplifier means in accordance with the characteristics of said developed current.

References Cited by the Examiner
UNITED STATES PATENTS

| | | | |
|---|---|---|---|
| 2,676,292 | 4/54 | Spencer | 318—229 |
| 2,958,814 | 11/60 | Foote | 318—513 |
| 3,065,386 | 11/62 | Carlson | 318—229 |

ORIS L. RADER, *Primary Examiner.*

JOHN F. COUCH, *Examiner.*